United States Patent
Ling et al.

(10) Patent No.: US 9,547,990 B2
(45) Date of Patent: Jan. 17, 2017

(54) ROTARY-WING AIRCRAFT EMERGENCY LANDING CONTROL

(71) Applicant: HONEYWELL INTERNATIONAL INC., Morristown, NJ (US)

(72) Inventors: Richard Ling, Scottsdale, AZ (US); Grant Gordon, Peoria, AZ (US); Kevin Moeckly, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 166 days.

(21) Appl. No.: 14/464,839

(22) Filed: Aug. 21, 2014

(65) Prior Publication Data

US 2016/0055754 A1    Feb. 25, 2016

(51) Int. Cl.

| G08G 5/00 | (2006.01) |
| B64C 13/18 | (2006.01) |
| G07C 5/08 | (2006.01) |
| B64D 45/00 | (2006.01) |
| B64C 27/00 | (2006.01) |

(52) U.S. Cl.
CPC ............. *G08G 5/0056* (2013.01); *B64C 13/18* (2013.01); *B64C 27/006* (2013.01); *B64D 45/00* (2013.01); *G07C 5/0808* (2013.01); *G08G 5/003* (2013.01); *G08G 5/0086* (2013.01); *G08G 5/0091* (2013.01); *B64D 2045/0085* (2013.01)

(58) Field of Classification Search
CPC ...................... G06K 9/00637; G06K 9/006512; G08G 5/0021; G08G 5/02; G08G 5/0056; G08G 5/003; B64D 13/18; G07C 5/0808
See application file for complete search history.

(56) References Cited

U.S. PATENT DOCUMENTS

| 3,100,095 A | 8/1963 | Jespersen |
| 4,137,721 A | 2/1979 | Glennon et al. |
| 4,147,035 A | 4/1979 | Moore et al. |

(Continued)

OTHER PUBLICATIONS

Meuleau et al.; An Emergency Landing Planner for Damaged Aircraft; Intelligent Systems Division NASA Ames Research Center; Copyright 2009, Association for the Advancement of Artificial Intelligence (www.aaai.org).

(Continued)

*Primary Examiner* — Basil T Jos
(74) *Attorney, Agent, or Firm* — Lorenz & Kopf, LLP

(57) ABSTRACT

An emergency landing control system for an aircraft includes a landing site data source, a performance margin data source, an engine health data source, an aircraft health data source, and a processor. The landing site data source determines, continuously and in real-time, available landing sites. The performance margin data source conducts, continuously and in real-time, continuous performance analysis of an engine. The engine health data source determines, continuously and in real-time, available engine power as a function of time. The aircraft health data source determines, continuously and in real-time, available aircraft life as a function of time. The processor receives data from these data sources and, based on these data, continuously generates landing paths to one or more of the available landing sites, and selectively and continuously adjusts maximum available engine power up to emergency power limits, as needed, during execution of a landing maneuver to a landing site.

20 Claims, 3 Drawing Sheets

(56) References Cited

U.S. PATENT DOCUMENTS

| | | |
|---|---|---|
| 4,277,945 A | 7/1981 | Esthimer et al. |
| 4,488,851 A | 12/1984 | Young |
| 4,500,966 A | 2/1985 | Zagranski et al. |
| 6,707,475 B1 | 3/2004 | Snyder |
| 6,917,908 B2 | 7/2005 | Williams |
| 7,031,812 B1 | 4/2006 | Pettigrew et al. |
| 7,236,876 B2 | 6/2007 | Sarlashkar et al. |
| 7,414,544 B2 | 8/2008 | Oltheten et al. |
| 7,512,462 B2 | 3/2009 | Nichols et al. |
| 7,689,328 B2 | 3/2010 | Spinelli |
| 8,036,844 B2 | 10/2011 | Ling et al. |
| 8,068,997 B2 | 11/2011 | Ling et al. |
| 8,464,980 B2 | 6/2013 | Certain |
| 8,594,932 B2 | 11/2013 | McIver |
| 2006/0089761 A1* | 4/2006 | Pettigrew ............... B64C 27/06 701/14 |
| 2006/0144997 A1 | 7/2006 | Schmidt et al. |
| 2010/0229809 A1* | 9/2010 | Braly ...................... F02P 5/04 123/41.56 |
| 2011/0054721 A1* | 3/2011 | Goodrich ........... G05B 23/0283 701/14 |
| 2011/0264312 A1* | 10/2011 | Spinelli ............... G08G 5/0021 701/16 |
| 2012/0060505 A1 | 3/2012 | Fuller et al. |
| 2013/0120165 A1 | 5/2013 | McCollough et al. |
| 2014/0297068 A1* | 10/2014 | Revell et al. ................... 701/16 |
| 2014/0346280 A1* | 11/2014 | Constans ............... B64C 19/00 244/175 |

OTHER PUBLICATIONS

Davidson, J. B. et al.: "Real-Time Adaptive Control Allocation applied to a High Performance Aircraft" 2001 5th SIAM Conference on Control & Its Applications; source: URL—http://dcb.larc.nasa.gov/DCBStaff/jbd/REPORTS/rtacat01vf.pdf.

Yang, Li-Farn, et al.: "Adaptive estimation of aircraft flight parameters for engine health monitoring system" Journal of aircraft, 2002, vol. 39, No. 3, pp. 404-408, published by American Institute of Aeronautics and Astronautics.

Krantz, Timothy L.: "A Method to Analyze and Optimize the Load Sharing of Split Path Transmissions" National Aeronautics and Space Administration Cleveland OH Lewis Research Center, Sep. 1996.

Stramiello, Andrew D., et al.: "Aviation Diagnostic and Engine Prognostic Technology (ADEPT) for the Chinook's T-55 Engine" Presented at the American Helicopter Society 59th Annual Forum, Phoenix, Arizona, May 6-8, 2003, published 2003 by the American Helicopter Society International, Inc.

* cited by examiner

ROTARY-WING AIRCRAFT EMERGENCY LANDING CONTROL

TECHNICAL FIELD

The present invention generally relates to rotary-wing aircraft control systems, and more particularly relates to an emergency landing control for rotary-wing aircraft.

BACKGROUND

Rotary-wing aircraft, such as helicopters, can take off and land vertically, hover, fly forward, backward, and laterally. Thus, helicopters are used in myriad environments and for myriad purposes that fixed-wing aircraft and other types of vertical takeoff and landing aircraft cannot. The environments range from deserts to oceans, from remote rural areas to sprawling urban areas. The purposes include personnel and cargo transportation, military, journalism, search and rescue, firefighting medical transport, tourism, and aerial observation, just to name a few.

Unfortunately, helicopters also exhibit certain drawbacks. In particular, the incidence of unintended ("emergency") landings for helicopters is undesirably high. There are many causes associated with these emergency landings. The leading causes, however, include operator error, equipment malfunctions, and hazardous weather. Regardless of its cause, in an emergency landing situation the pilot must decide where and how to land the aircraft. Often the pilot has to choose between landing immediately, without regard to the nature of the landing zone, and attempting to reach a more desirable landing zone. The distinction between these choices may not be clear, and the information the pilot may need to fully assess the situation may not be available. Moreover, the workload pressures placed on the pilot while executing an emergency landing may actually exacerbate the situation.

Hence, there is a need for a system that provides more clear and distinct choices and/or sufficient information to a pilot when an emergency landing maneuver needs to be conducted and/or reduces the workload pressures on the pilot when executing an emergency landing maneuver. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an emergency landing control system for an aircraft that includes at least one engine includes a landing site data source, a performance margin data source, an engine health data source, an aircraft health data source, and a processor. The landing site data source is configured to determine, continuously and in real-time, one or more available landing sites, and to supply landing site data representative thereof. The performance margin data source is configured to conduct, continuously and in real-time, a continuous performance analysis of the engine, and to supply performance margin data representative thereof. The engine health data source is configured to determine, continuously and in real-time, available engine power as a function of time, and to supply engine health data representative thereof. The aircraft health data source configured to determine, continuously and in real-time, available aircraft life as a function of time, and to supply aircraft health data representative thereof. The processor is coupled to receive the landing site data, the performance margin data, the engine health data, and the aircraft health data and is configured, based on these data, to continuously generate landing paths to one or more of the available landing sites.

In another embodiment, an emergency landing control system for an aircraft that includes at least a first engine and a second engine includes a landing site data source, a performance margin data source, an engine health data source, an aircraft health data source, and a processor. The landing site data source is configured to determine, continuously and in real-time, one or more available landing sites, and to supply landing site data representative thereof. The performance margin data source is configured to conduct, continuously and in real-time, a continuous performance analysis of each of the first and second engines, and to supply performance margin data representative thereof. The engine health data source is configured to determine, continuously and in real-time, available engine power for each of the first and second engines as a function of time, and to supply engine health data representative thereof. The aircraft health data source is configured to determine, continuously and in real-time, available aircraft life as a function of time, and to supply aircraft health data representative thereof. The processor is coupled to receive the landing site data, the performance margin data, the engine health data, and the aircraft health data and configured, based on these data, to continuously generate landing paths to one or more of the available landing sites and adjust available engine power as needed, up to maximum power available, for execution of a landing maneuver to one of the available sites.

In yet another embodiment, an emergency landing control system for an aircraft that includes at least one engine includes a landing site data source, a performance margin data source, an engine health data source, an aircraft health data source, and a processor. The landing site data source is configured to determine, continuously and in real-time, one or more available landing sites, and to supply landing site data representative thereof. The performance margin data source is configured to conduct, continuously and in real-time, a continuous performance analysis of the engine, and to supply performance margin data representative thereof. The engine health data source is configured to determine, continuously and in real-time, available engine power as a function of time, and to supply engine health data representative thereof. The aircraft health data source configured to determine, continuously and in real-time, available aircraft life as a function of time, and to supply aircraft health data representative thereof. The processor is coupled to receive the landing site data, the performance margin data, the engine health data, and the aircraft health data and is configured, based on these data, to selectively and continuously adjust maximum available engine power up to emergency power limits, as needed, during execution of a landing maneuver to a landing site.

Furthermore, other desirable features and characteristics of the emergency landing control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
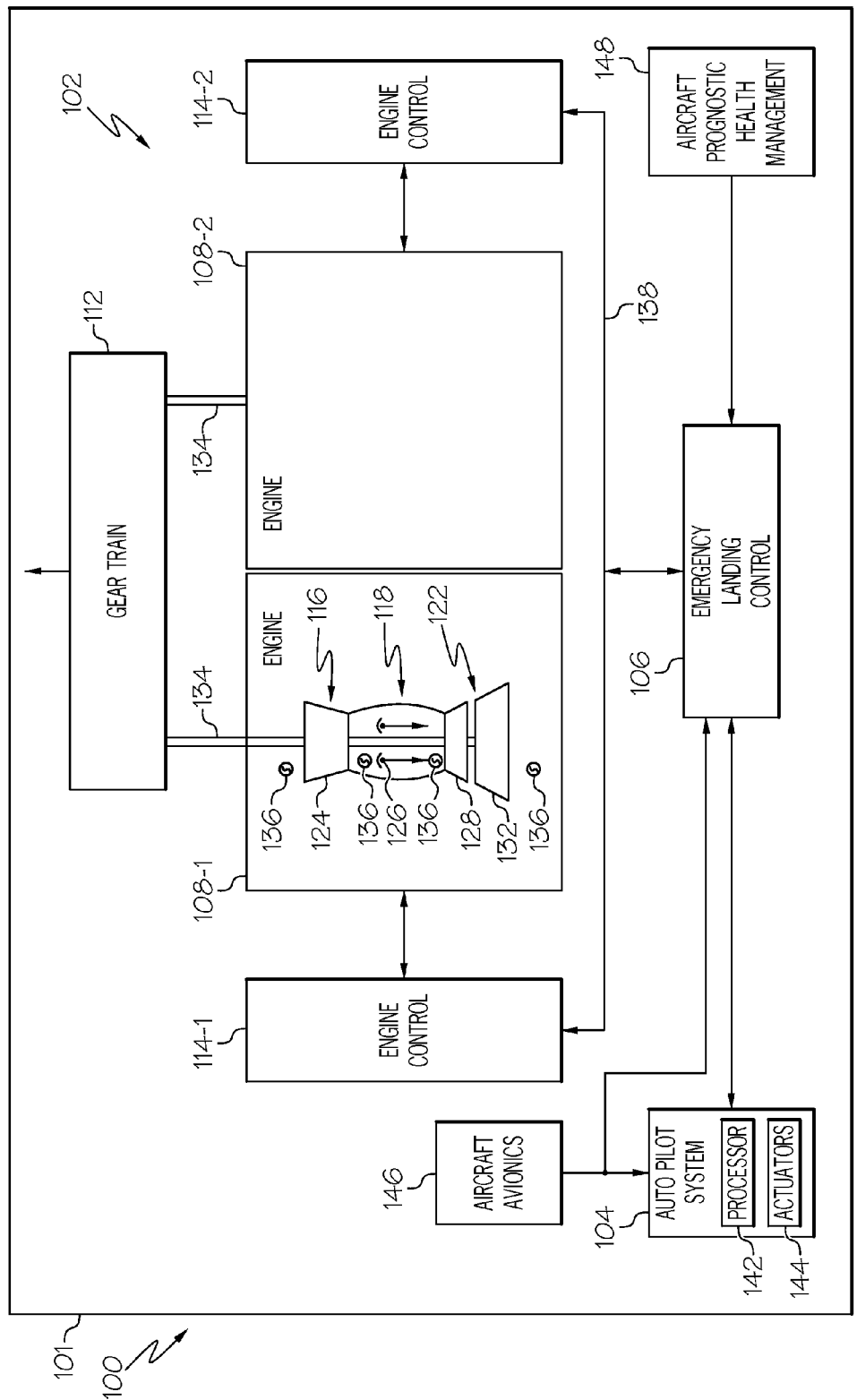
FIG. 1 depicts a simplified functional block diagram of portions of a rotary-wing aircraft.

Referring to FIG. 1, a functional block diagram of portions of a rotary-wing aircraft 100, such as a helicopter, is depicted. The depicted aircraft 100 includes at least a power train 102, an auto-pilot 104, and an emergency landing control 106 all disposed on or in a fuselage 101. The power train includes two engines 108 (a first engine 108-1 and a second engine 108-2), a gear train 112, and two engine controls 114 (a first engine control 114-1 and a second engine control 114-2). It should be noted that although the aircraft 100 of FIG. 1 is depicted as including only two engines 108, it could be implemented with more than this number of engines 108, if needed or desired.

The engines 108, at least in the depicted embodiment, are implemented using gas turbine engines, and more particularly single-spool turbo-shaft gas turbine propulsion engines. Thus, each engine 108 includes a compressor section 116, a combustion section 118, and a turbine section 122. The compressor section 116, which may include one or more compressors 124, draws air into its respective engine 100 and compresses the air to raise its pressure. In the depicted embodiment, each engine includes only a single compressor 124. It will nonetheless be appreciated that each engine 108 may include one or more additional compressors.

No matter the particular number of compressors 124 that are included in the compressor sections 116, the compressed air is directed into the combustion section 118. In the combustion section 116, which includes a combustor assembly 126, the compressed air is mixed with fuel supplied from a non-illustrated fuel source. The fuel and air mixture is combusted, and the high energy combusted air mixture is then directed into the turbine section 122.

The turbine section 122 includes one or more turbines. In the depicted embodiment, the turbine section 122 includes two turbines, a high pressure turbine 128 and a free power turbine 132. However, it will be appreciated that the engines 108 could be configured with more or less than this number of turbines. No matter the particular number, the combusted air mixture from the combustion section 118 expands through each turbine 128, 132, causing it to rotate an associated power shaft 134. The combusted air mixture is then exhausted from the engines 108. The power shafts 134 are each coupled to, and supply a drive torque to, the gear train 112.

The gear train 112 is coupled to receive the drive torque supplied from each of the engines 108. The gear train 112, which may include one or more gear sets, preferably includes at least a combiner transmission, which in turn supplies the combined drive torque to one or more rotors.

The engine controls 114 are each in operable communication with one of the engines 108. In the depicted embodiment, for example, the first engine control 114-1 is in operable communication with the first engine 108-1, and the second engine control 114-2 is in operable communication with the second engine 108-2. Each engine control 114 is configured, among other things, to control the operation of its associated engine 108, both during normal operation and in the unlikely event the pilot needs to make an emergency landing. To implement this functionality, the engine controls 114 are each coupled to receive various control and performance data from its associated engine 108 and, as will be described in more detail further below, supplies data to and receives commands from the emergency landing control system 106.

The control and performance data supplied from each engine 108 are derived from a plurality of sensors 136. Each of the sensors 136 is coupled to its associated engine control 114 and is operable to sense an engine parameter and supply control and performance data representative of the sensed parameter to the engine control 114. It will be appreciated that the particular number, type, and location of each sensor 136 may vary. It will additionally be appreciated that the number and types of control and performance data supplied by the sensors 136 may vary depending, for example, on the particular engine type and/or configuration. In the depicted embodiment, however, at least a subset of the depicted sensors 136 supply control and performance data representative of, or that may be used to determine, engine inlet pressure, engine inlet temperature, engine speed, fuel flow, compressor discharge pressure, power turbine inlet temperature, engine torque, shaft horsepower, and thrust, to name just a few.

Each engine control 114 may additionally be configured, in response to the control and performance data, to continuously conduct analyses of its associated engine 108. Moreover, each engine control 108 could receive various control and performance data from the other engine control 108 via a data link 138 that interconnects the two engine controls 114. The engine controls 114, based on the analyses, such as remaining useful life estimation, could control the operation of its associated engine 108 to minimize the difference between the remaining life to the life limiting part(s) of each engine 108. To do so, the engine controls 114 are each configured to conduct continuous, real-time analyses of its associated engine 108 to thereby continuously determine, in real-time, the remaining useful life of its associated engine 108, and to implement feedback controls that will shift the load between the engines 108 so that a maximum remaining life is achieved for the combined engine pair.

Before proceeding further, it is noted that the continuous, real-time performance analyses are preferably conducted using the methodology described in U.S. Pat. No. 8,068,997, entitled "Continuous Performance Analysis System and Method," and assigned to the assignee of the instant application. The entirety of this patent, which issued on Nov. 29, 2011, is hereby incorporated by reference. It is further noted that the feedback controls that shift the load between the engines 108 so that there is more load on the engine 108 with higher performance margin are preferably implemented using the methodology described in U.S. patent application Ser. No. 13/870,302, entitled "Multi-Engine Performance Margin Synchronization Adaptive Control system and Method," and assigned to the assignee of the instant application. The entirety of this patent application, which was filed on Apr. 25, 2013, is hereby incorporated by reference. Additionally, the operations of the engines 108 so that the remaining useful lives of each engine 108 are substantially equal are preferably implemented using the methodology described in U.S. patent application Ser. No. 14/030,039, entitled "Adaptive Remaining Useful Life Balancing Control System and Method for Multi-Engine Systems," and assigned to the assignee of the instant application. The entirety of this patent application, which was filed on Sep. 18, 2013, is hereby incorporated by reference.

Returning once again to the description, the autopilot system 104 is configured, when engaged, to automatically fly the helicopter 100 and/or control certain flight control functions. In the depicted embodiment, the autopilot system 104 includes at least an autopilot processor 142 and a plurality of actuators 144 that are connected to the flight controls. The number, type, and location of the actuators 144 may vary and may depend, for example, on the type of system (e.g., two-axis, three-axis, or four-axis control). The actuators 144 respond to commands supplied by the autopilot processor 142 to position the appropriate flight controls (not depicted). The autopilot processor 142 generates these commands in response to data from an avionics system 146. As FIG. 1 also depicts, the autopilot processor 142 may also receive input from the emergency landing control 106.

The emergency landing control 106 is in operable communication with the engine controls 114, the autopilot system 104, the avionics systems 146, and an aircraft prognostic health management system 148. The emergency landing control 106, together with these other components, systems, and subsystems, implements an emergency landing control system. In particular, and as will be described in more detail below, the emergency landing control 106, when engaged, processes landing site data, performance margin data, engine health data, and aircraft health data to continuously generate landing paths to one or more available emergency landing sites.

Figure 2:
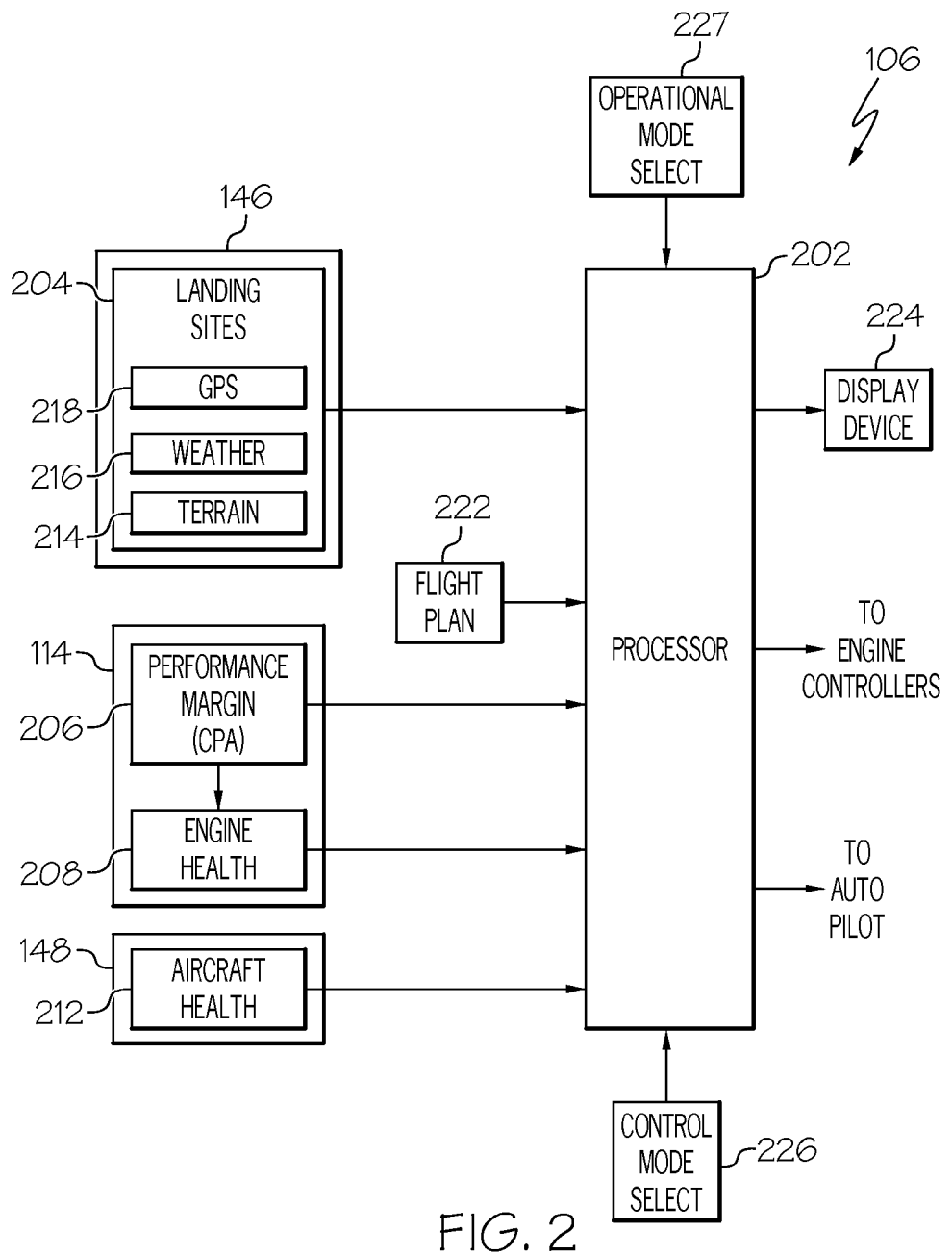
FIG. 2 depicts a functional block diagram of an emergency landing control that may be implemented in the rotary-wing aircraft of FIG. 1.

Turning now to FIG. 2, a functional block diagram of the emergency landing control 106 is depicted and will be described. The emergency landing control 106 is implemented using one or more processors 202 (only one depicted), and is coupled to receive data from a landing site data source 204, an engine performance margin data source 206, an engine health data source 208, and an aircraft health data source 212. The landing site data source 204 is configured to determine, continuously and in real-time, one or more available landing sites, and to supply landing site data representative of the one or more available landing sites. The landing site data source 204 may be variously configured and implemented to generate and supply these data, but in the depicted embodiment the landing site data source 204 is implemented using portions of the aircraft avionics 116. In particular, and as FIG. 2 depicts, the landing site data source 204 includes a terrain data source 214, a weather data source 216, and an aircraft position data source 218, embodiments of which will now be briefly described.

The terrain data source 214 has terrain data stored therein that is representative of the terrain over which the aircraft 100 is (or may be) flying, and may be implemented using any one of numerous known terrain data sources. The weather data source 216 is configured to collect and/or retrieve weather data and supply weather data representative thereof. The weather data source 216 may be implemented using suitable meteorological sensors on board the aircraft 100, or as a system that is configured to receive weather data from one or more external sources. The position data source 218 is configured to track vehicle position and supply position data representative thereof. The position data source 218 may be variously implemented, but in the depicted embodiment it is implemented using a global positioning system (GPS) but could also include an inertial navigation system (INS), attitude and heading reference system (AHRS), and/or a smart map system.

The performance margin data source 206 is configured to conduct, continuously and in real-time, a continuous performance analysis of each of the first and second engines, and to supply performance margin data representative thereof. To do so, the performance margin data source 206 preferably conducts the continuous, real-time performance analyses that are described in above-referenced U.S. Pat. No. 8,068,997. The performance margin data source 206 may be implemented as a separate, stand-alone subsystem, but in the depicted embodiment, the engine controls 114 implement this functionality since, at least in the depicted embodiment, the engine controls 114, as noted above, are configured to generate the performance margin data.

The engine health data source 208 is configured to determine, continuously and in real-time, the available engine power for each of the engines 108 as a function of time, and to supply engine health data representative thereof. To do so, the engine health data source 208 preferably implements the methodology described in above-referenced U.S. patent application Ser. No. 14/030,039 ("the '039 application"). The engine health data source 208 may be implemented as a separate, stand-alone subsystem, but in the depicted embodiment, the engine controls 114 implement this functionality since, at least in the depicted embodiment, the engine controls 114, as noted above, are configured to implement the methodology of the '039 application.

The aircraft health data source 212 is configured to determine, continuously and in real-time, the available aircraft life in terms of time, and to supply aircraft health data representative thereof. In the depicted embodiment, the aircraft health data source 212 is implemented using the previously mentioned aircraft prognostic health management system 148. The aircraft prognostic health management system 148 may be implemented using any one of numerous known prognostic health management systems.

Regardless of how each of the specific data sources 204-212 is implemented, the processor 202 is coupled to receive the real-time data supplied thereby. Thus, the processor 202 receives the landing site data, the performance margin data, the engine health data, and the aircraft health data. The processor 202 is configured, based on these real-time data, to continuously generate landing paths to one or more of the available landing sites. More specifically, the processor 202 uses the real-time performance margin data to determine the available engine power for each engine 108. The processor 202 uses the real-time engine health data and the available engine power to determine the available engine power as a function of engine time. The processor 202 uses the real-time aircraft health data to determine aircraft air time and landing zone range. The processor 202 also implements a suitable optimization algorithm, such as the model predictive control (MPC) algorithm, which uses the landing site data, the determined engine power and remaining available time, and the determined aircraft air time, to generate the available landing paths that satisfy the constraints in power, air time, and available landing sites. The processor 202, as described further below, may also be configured to coordinate engine 108 and aircraft 100 operations to execute the optimized landing solutions.

In addition to the above, the processor 202 is also configured, based on the real-time engine and aircraft health data, estimates additional engine power that is available when an emergency power mode is activated. The emergency power mode may be activated by the pilot and, when activated, allows the engine controls 114 to operate its associated engine 108 at higher temperature and speed limits than during normal power operation. The estimated additional engine power is then used to determine additional available landing sites, as the aircraft air time and landing zone range may be extended significantly due to the availability of the additional power when the emergency power mode is activated. When the emergency power mode is activated, the optimization algorithm uses the additional emergency power and its availability duration, in addition to landing site data, and determined aircraft air time, to generate the addition emergency mode landing paths that satisfy the constraints in power, air time, and available landing sites.

Figure 3:
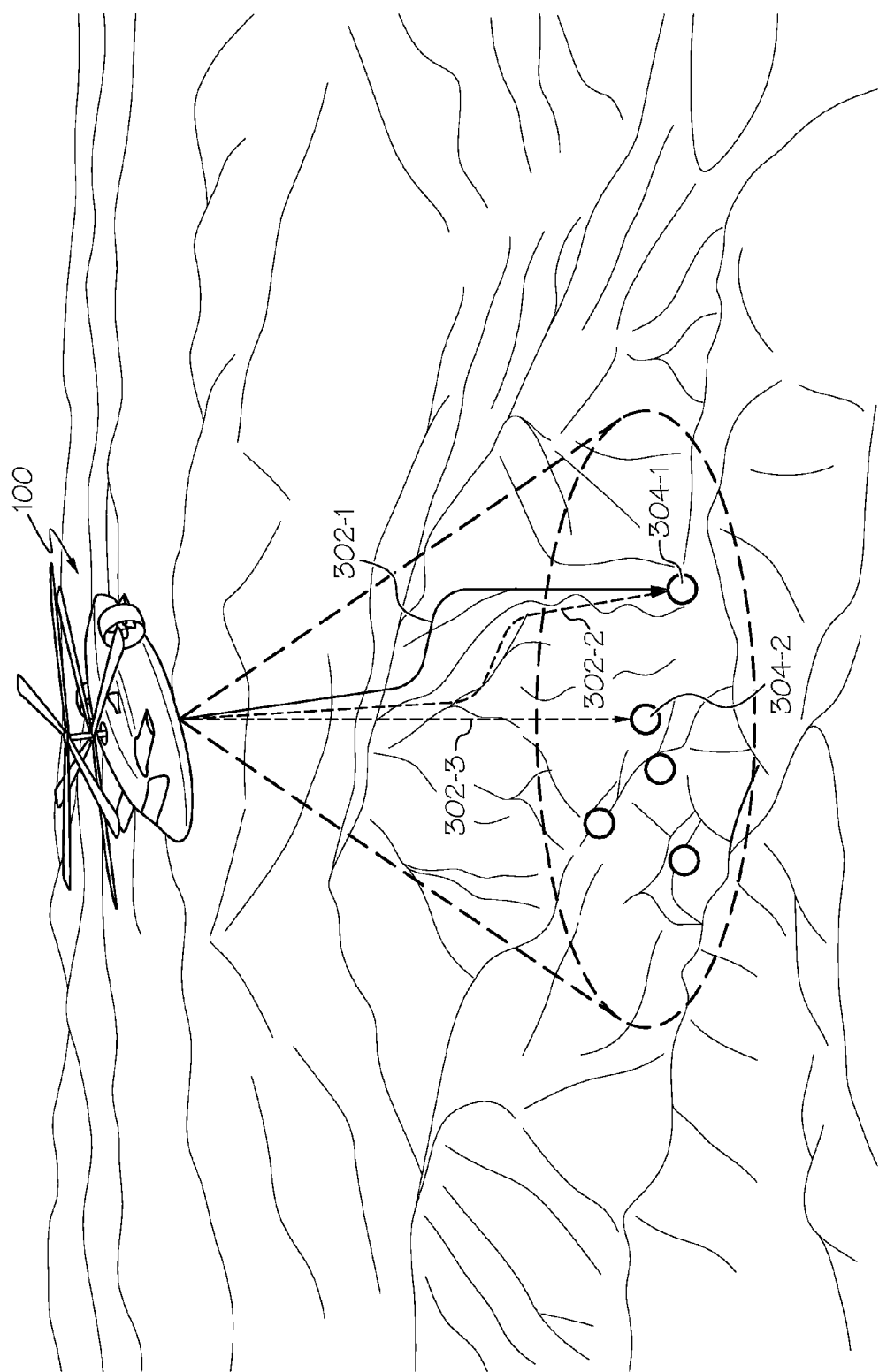
FIG. 3 illustrates how the emergency landing control may automatically generate one or more landing sites and landing paths for the aircraft of FIG. 1.

To provide one illustrative example, reference should now be made to FIG. 3. In this example, the processor 202, based on landing site data, weather data, the performance margin data, the engine health data, the aircraft health data, and emergency power, if the emergency power mode is activated, generates an initial landing path 302-1 to an initial preferred landing site 304-1. However, as some or all of these data are continuously updated, the processor 202 may generate an updated landing path 302-2 to the first landing site 304-1, or generate yet another landing path 302-3 to an updated preferred landing site 304-2.

Returning once again to FIG. 2, it is seen that the processor 202 may, in some embodiments, also receive flight plan data from a flight plan data source 222. The flight plan data are representative of a predetermined flight plan for the aircraft 100, and include data representative of a preferred landing site. As used herein, the term "preferred landing site" means the landing site associated with the original flight plan for the aircraft 100. The flight plan data source 222, if included, may be implemented as a separate, stand-alone subsystem, or as part of the aircraft avionics 146. In one particular embodiment, the flight plan data source 222 is implemented as part of an aircraft flight management system. In those embodiments that do include the flight plan data source 222, the processor 202 is further configured to generate landing paths to one or more of the available landing sites based additionally on the preferred landing site.

The processor 202 may also, in some embodiments, be in operable communication with a display device 224 that, in response to image rendering display commands, renders one or more images. In these embodiments, the processor 202 is further configured to supply image rendering display commands to the display device 224 that cause the display device 224 to render images of the one or more landing paths.

The processor 202 is further configured, in some embodiments, to operate in a manual mode or an automatic mode. In such embodiments, the processor 202 may be coupled to receive a control mode select signals from, for example, a control mode selector 226 that is in operable communication with the processor 202. Additionally, as was mentioned previously, the processor 202 is further configured, in some embodiments, to operate in either a normal power mode or an emergency power mode. In such embodiments, the processor 202 may be coupled to receive an operational mode select signal from, for example, an operational mode selector 227 that is in operable communication with the processor 202. The control mode selector 226 and operation mode selector 227 may be variously configured and implemented. For example, each may be a switch, a knob, or any one of numerous other user interface devices responsive to input from a user for generating and supplying the control and operational mode select signals.

No matter how the control and operational mode selectors 226, 227 are implemented, when the processor 202 is configured to operate in the manual mode, the pilot may select the landing site and landing path from the one or more that are generated by the processor 202. The pilot may also manually control the engines 108 and aircraft 100 to maneuver the aircraft 100 to the selected landing site along the selected landing path. In the manual mode, the processor 202 may also be configured to automatically select the landing site and landing path from the one or more that are generated, while the pilot manually control the engines 108 and aircraft 100 to maneuver the aircraft 100 to the selected landing site along the selected landing path.

In the automatic mode, the processor 202 may automatically select the landing sit and landing path or allow the pilot to select the landing site and landing path. In either case, the processor 202 is additionally configured to generate and supply aircraft commands and first and second engine commands. The aircraft commands are supplied, for example, to the autopilot 104 for automatically controlling the aircraft 100. The first engine commands are supplied to the first engine controller 114-1 for automatically controlling the first engine 108-1, and the second engine commands are supplied to the second engine controller 114-2 for automatically controlling the second engine 108-2. Thus, as alluded to above, the processor 202, at least in the automatic mode, coordinates the engine 108 and aircraft 100 operations to execute the optimized landing solutions.

The processor 202, in addition to continuously generating the landing paths to one or more of the available landing sites, is configured to continuously adjust the settings in the engine controls 114 to allow an appropriate amount of additional engine power during an emergency landing when the emergency power mode is activated. In one particular embodiment, the processor optimally adjusts the engine temperature and speed limits while generating the optimal landing routes such that the resulting routes will not result in engine failure while increasing the landing range and site selection. The processor 202 then actively and continuously adjusts the engine controls such that the engine power matches the power requirement of the selected route throughout the landing operation. Thus, the emergency landing control 108 described herein is configured to implement more than just a routing tool. The emergency landing control 108 implements an active engine control function to manage the engine power optimally during emergency landing when emergency power mode is activated.

The control described herein provides relatively clear and distinct choices and/or sufficient information to a pilot when an emergency landing maneuver needs to be conducted. The control can also significantly reduce the workload pressures on the pilot when executing an emergency landing maneuver. The control also increases the number of feasible landing sites and routes. The control significantly reduces (if not eliminates) the likelihood of engine failure before landing, which is a drawback of prior emergency power approaches that allow the engines to exceed the normal maximum engine power during an emergency but do not actively manage the remaining life of the engine and hence risk engine failure.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An emergency landing control system for an aircraft that includes at least one engine, the system comprising:
    a landing site data source configured to determine, continuously and in real-time, one or more available landing sites, and to supply landing site data representative thereof;
    a performance margin data source configured to conduct, continuously and in real-time, a continuous performance analysis of the engine, and to supply performance margin data representative thereof;
    an engine health data source configured to determine, continuously and in real-time, available engine power as a function of time, and to supply engine health data representative thereof;
    an aircraft health data source configured to determine, continuously and in real-time, available aircraft life as a function of time, and to supply aircraft health data representative thereof; and
    a processor coupled to receive the landing site data, the performance margin data, the engine health data, and the aircraft health data and configured, based on these data, to continuously generate landing paths to one or more of the available landing sites.

2. The system of claim 1, wherein the processor is further configured to selectively and continuously adjust available engine power up to either normal maximum power limits or emergency power limits, as needed, during execution of a landing maneuver to one of the available sites.

3. The system of claim 2, wherein:
the processor is adapted to receive an operational mode select signal and is configured, in response thereto, to operate in either a normal power mode or an emergency power mode;
in the normal mode, the processor continuously adjusts the available engine power up to the normal maximum power limits; and
in the emergency power mode, the processor continuously adjust available engine power up to the emergency power limits.

4. The system of claim 3, further comprising:
an operational mode selector in operable communication with the processor, the operational mode selector adapted to receive user input and configured, upon receipt thereof, to supply the operational mode select signal.

5. The system of claim 1, wherein:
the processor is adapted to receive a control mode select signal and is configured, in response thereto, to operate in either an automatic mode or a manual mode;
in the automatic mode, the processor generates and supplies aircraft and engine commands for automatically controlling the aircraft during landing; and
in the manual mode, the processor does not generate and supply the aircraft and engine commands.

6. The system of claim 5, further comprising:
a control mode selector in operable communication with the processor, the control mode selector adapted to receive user input and configured, upon receipt thereof, to supply the control mode select signal.

7. The system of claim 5, further comprising:
an engine control coupled to receive the engine commands from the processor and configured, upon receipt thereof, to control the engine;
an aircraft control coupled to receive the aircraft commands from the processor and configured, upon receipt thereof, to control the aircraft; and
an auto-pilot coupled to receive the aircraft commands from the processor and configured, upon receipt thereof, to automatically control the aircraft.

8. The system of claim 1, further comprising:
a display device coupled to receive image rendering display commands and configured, in response thereto, to render one or more images,
wherein the processor is in operable communication with the display device and is further configured to supply image rendering display commands to the display device that cause the display device to render images of the generated landing paths.

9. The system of claim 1, further comprising:
flight plan data source configured to supply flight plan data representative of a predetermined flight plan for the aircraft, the flight plan data including data representative of a preferred landing site,
wherein the processor is further coupled to receive the flight plan data and is configured to generate landing paths to one or more of the available landing sites based additionally on the preferred landing site.

10. The system of claim 1, wherein the landing site data source comprises:
a terrain data source having terrain data stored therein that is representative of the terrain;
a weather data source configured to supply weather data representative of weather; and
aircraft position sensor configured to track vehicle position and supply position data representative thereof.

11. An emergency landing control system for an aircraft that includes at least a first engine and a second engine, the system comprising:
a landing site data source configured to determine, continuously and in real-time, one or more available landing sites, and to supply landing site data representative thereof;
a performance margin data source configured to conduct, continuously and in real-time, a continuous performance analysis of each of the first and second engines, and to supply performance margin data representative thereof;
an engine health data source configured to determine, continuously and in real-time, available engine power for each of the first and second engines as a function of time, and to supply engine health data representative thereof;
an aircraft health data source configured to determine, continuously and in real-time, available aircraft life as a function of time, and to supply aircraft health data representative thereof; and
a processor coupled to receive the landing site data, the performance margin data, the engine health data, and the aircraft health data and configured, based on these data, to (i) continuously generate landing paths to one or more of the available landing sites and (ii) adjust available engine power as needed, up to maximum power available, for execution of a landing maneuver to one of the available sites.

12. The system of claim 11, wherein:
the processor is adapted to receive an operational mode select signal and is configured, in response thereto, to operate in either a normal power mode or an emergency power mode;
in the normal mode, the processor continuously adjusts the available engine power up to normal maximum power limits; and
in the emergency power mode, the processor continuously adjusts available engine power up to emergency power limits.

13. The system of claim 11, wherein:
the processor is adapted to receive a control mode select signal and is configured, in response thereto, to operate in either an automatic mode or a manual mode;
in the automatic mode, the processor generates and supplies aircraft commands for automatically controlling the aircraft, first engine commands for automatically controlling the first engine, and second engine commands for automatically controlling the second engine; and
in the manual mode, the processor does not generate and supply the aircraft commands, the first engine commands, and the second engine commands.

14. The system of claim 13, further comprising:
an aircraft control coupled to receive the aircraft commands from the processor and configured, upon receipt thereof, to control the aircraft;
a first engine control associated with the first engine and coupled to receive the first engine commands from the processor, the first engine control configured, upon receipt of the first engine commands, to control the first engine; and
a second engine control associated with the second engine and coupled to receive the second engine commands from the processor, the second engine control configured, upon receipt of the second engine commands, to control the second engine.

15. The system of claim 13, wherein:
the first and second engines each have a remaining useful life;
the first and second engine controls are in operable communication with each other; and each is further configured to control operations of at least its associated engine in a manner that the remaining useful lives of the first and second engines are substantially equal.

16. The system of claim 15, further comprising:
an auto-pilot coupled to receive the aircraft commands from the processor and configured, upon receipt thereof, to automatically control the aircraft.

17. The system of claim 13, wherein:
the first and second engine controls are in operable communication with each other; and each is further configured to:
  calculate a difference between performance margins of the first and second engines, and
  control its associated engine to attain a predetermined difference between the performance margins of the first and second engines.

18. The system of claim 11, further comprising:
a display device coupled to receive image rendering display commands and configured, in response thereto, to render one or more images,
wherein the processor is in operable communication with the display device and is further configured to supply image rendering display commands to the display device that cause the display device to render images of the generated landing paths.

19. The system of claim 18, wherein:
the processor is adapted to receive an operational mode select signal and is configured, in response thereto, to operate in either a normal power mode or an emergency power mode;
in the normal mode, the processor continuously adjusts the available engine power up to normal maximum power limits; and
in the emergency power mode, the processor continuously adjusts available engine power up to the emergency power limits.

20. An emergency landing control system for an aircraft that includes at least one engine, the system comprising:
a landing site data source configured to determine, continuously and in real-time, one or more available landing sites, and to supply landing site data representative thereof;
a performance margin data source configured to conduct, continuously and in real-time, a continuous performance analysis of the engine, and to supply performance margin data representative thereof;
an engine health data source configured to determine, continuously and in real-time, available engine power as a function of time, and to supply engine health data representative thereof;
an aircraft health data source configured to determine, continuously and in real-time, available aircraft life as a function of time, and to supply aircraft health data representative thereof; and
a processor coupled to receive the landing site data, the performance margin data, the engine health data, and the aircraft health data and configured, based on these data, to selectively and continuously adjust maximum available engine power up to emergency power limits, as needed, during execution of a landing maneuver to a landing site.

* * * * *